United States Patent [19]

Fukumoto et al.

[11] Patent Number: 4,709,091
[45] Date of Patent: * Nov. 24, 1987

[54] PRODUCTION OF POLYMALEIC ACID

[75] Inventors: Yasuhisha Fukumoto; Moboru Moriyama, both of Wakayama, Japan

[73] Assignee: Kao Corporation, Tokyo, Japan

[ * ] Notice: The portion of the term of this patent subsequent to May 26, 2004 has been disclaimed.

[21] Appl. No.: 716,792

[22] Filed: Mar. 27, 1985

[30] Foreign Application Priority Data

Apr. 6, 1984 [JP] Japan .................................. 59-68564

[51] Int. Cl.$^4$ ........................................... C07C 51/347
[52] U.S. Cl. ....................................... 562/595; 252/80; 252/180; 210/701; 526/89; 526/219; 526/227; 526/229; 526/240; 526/271; 526/318.2; 560/198; 560/199; 560/201
[58] Field of Search ....................... 560/198, 199, 201; 562/595; 526/89, 229, 75, 78, 240, 217, 317, 310, 311, 286, 320, 219, 271, 318.2

[56] References Cited

U.S. PATENT DOCUMENTS

| | | | |
|---|---|---|---|
| 3,218,298 | 11/1965 | Piganiol | 562/595 X |
| 3,268,491 | 8/1966 | Hattori et al. | 526/229 |
| 3,308,067 | 3/1967 | Diehl | 252/550 |
| 3,340,238 | 9/1967 | Smith et al. | 526/88 |
| 3,574,705 | 4/1971 | Linden et al. | 560/201 X |
| 3,634,503 | 1/1972 | Bowman | 562/595 |
| 3,699,155 | 10/1972 | Brady | 560/201 X |
| 4,589,995 | 5/1986 | Fukumoto et al. | 252/180 |

OTHER PUBLICATIONS

Chemical Abstracts, vol. 86:90588a, (1977).

Primary Examiner—Werren B. Lone
Assistant Examiner—Vera C. Clarke
Attorney, Agent, or Firm—Flynn, Thiel, Boutell & Tanis

[57] ABSTRACT

A polymer or copolymer of maleic acid is produced by neutralizing (I) maleic acid in an aqueous medium with (III) an alkali metal hydroxide or ammonia at a molar ratio of (I) to (III) in the range of 100:0 to 100:90, polymerizing (I) with a polymerization initiator, adding (III) a further amount of the alkali metal hydroxide or ammonia at a molar ratio of (I) to (III) in the range of 100:100 to 100:130 in total through the previous addition and this addition and continuing the polymerization to the complete effect.

11 Claims, No Drawings

PRODUCTION OF POLYMALEIC ACID

The present invention relates to a process for producing polymaleic acid and maleic acid copolymers. More particularly, the invention relates to a process for producing polymaleic acid and maleic acid copolymers effectively in an aqueous medium. The invention process provides a copolymer containing the maleic acid component at a high content such as 50 mole percent or above.

A polymaleic acid and a copolymer thereof with another monomer have been used as a dispersing agent and a scaling inhibitor. Polymaleic acid is produced in the prior art by using a peroxide such as benzoyl peroxide as a polymerization initiator in an organic solvent such as toluene or xylene. However, from an industrial viewpoint, an aqueous medium is far more desirable than the organic medium with respect to the ease of production, reduction of cost and the prevention of fire. However, studies of the polymerization of polymaleic acid salts in an aqueous solvent have scarcely been reported. Only copolymers of maleic acid with acrylic acid or vinyl acetate have been reported.

It has been suggested in the literature that when the molar ratio of maleic acid to polymaleic acid or maleic acid copolymer used as the scaling inhibitor is reduced, the scaling-inhibiting activity is reduced due to a reduction of charge density. Thus, it is supposed that the polymaleic acid and maleic copolymer having a high maleic acid content have an excellent scaling inhibiting effect. Under these circumstances, it has been demanded to produce these polymers efficiently at a low cost.

After intensive investigations of the production of polymaleic acid and maleic acid copolymers under these circumstances, the inventors have found that the polymaleic acid and maleic acid copolymers can be produced efficiently in an aqueous medium under specified conditions, though the production of them in an aqueous medium has been considered to be difficult. The present invention has been completed on the basis of this finding.

According to the invention, a polymer of maleic acid is produced by the steps of:

neutralizing a monomer of (I) maleic acid or anhydride thereof in an aqueous medium with (III) an alkali metal hydroxide or ammonia at a molar ratio of (I) to (III) in the range of 100:0 to 100:90, polymerizing the monomer with a polymerization initiator, adding (III) a further amount of the alkali metal hydroxide or ammonia at a molar ratio of (I) to (III) in the range of 100:100 to 100:130 in total through the previous addition and this addition and continuing the polymerization to the complete effect.

When a monomer mixture of maleic acid and another monomer is used in the process, a copolymer of maleic acid is obtained. A suitable co-monomer (II) may be used with the monomer of maleic acid or anhydride thereof to obtain a copolymer. It may be added to the polymerization system before the first neutralization step, after the first neutralization step or after the second neutralization step. Moreover it is also practical that a part of the co-monomer is added before the first neutralization step and the other is added later. The co-monomer (II) may be used in an amount of up to 100 moles, preferably up to 50 moles, per 100 moles of the monomer of maleic acid or anhydride thereof (I).

A co-monomer to be used in the invention process is preferably defined below. It includes as preferable embodiments an unsaturated alcohol such as (meth)allyl alcohol, (meth)allyl glyceryl ether and polyoxyethylene monoallylether, sodium unsaturated sulfonate such as sodium (meth)allyl sulfonate and sodium styrene sulfonate, (meth)acrylic amide and a hydroxy group-having (meth)acrylic ester such as hydroxyethyl (meth)acrylate.

In other words, the invention relates to a process for producing polymaleic acid and its copolymers by homopolymerizing maleic acid or its anhydride (I) or copolymerizing it with another polymerizable monomer (II) in an aqueous medium to form maleic acid homopolymer or copolymer, characterized by polymerizing maleic acid or its anhydride (I) in the presence of a polymerization initiator in an aqueous solution after neutralization with an alkali metal hydroxide or ammonia (III) in a molar ratio of (I) to (III) of 100:0 to 100:90, then adding the alkali metal hydroxide or ammonia (III) to the polymerization system to control the molar ratio of (I) to (III) to 100:100 or 100:130 and further continuing the reaction to complete the polymerization reaction.

Particularly preferred copolymerizable monomers (II) include compounds of the general formula:

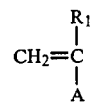

wherein $R_1$ represents hydrogen or a methyl group and A represents —CH$_2$—OH, $$-CH_2-O-CH_2-CH-CH_2,$$
$$\quad\quad\quad\quad\quad\quad | \quad\quad |$$
$$\quad\quad\quad\quad\quad\quad OH \quad OH$$

—CH$_2$—(OR$_{2n}$)OH (OR$_2$ being an oxyalkylene group having 2 or 3 carbon atoms and n being an integer of 1 to 50),

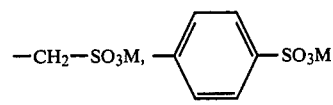

(M being an alkali metal or ammonium), —CONH$_2$ or —COOCH$_2$CH$_2$OH. They are suitable for use in the process of the present invention owing to their solubility in water. They may be used either alone or in the form of a mixture of two or more of them. The molar ratio of (I) to (II) is preferably in the range of 100:0 to 100:100 from the viewpoint of the scaling inhibition capacity. Particularly when A in the formula of the copolymerizable monomer (II) is —CH$_2$—OR$_{2n}$OH, the molar ratio of (I) to (II) in the range of 100:0 to 100:50 is preferred.

The process of the present invention will now be described in detail. An aqueous solution of an alkali metal hydroxide, such as sodium hydroxide or potassium hydroxide, or aqueous ammonia (III) is added to an aqueous solution or suspension of maleic acid or maleic anhydride (I) prior to the polymerization or the aqueous maleic acid solution is subjected to the polymerization directly without the addition of the alkaline solution in the first stage. The molar ratio of (I) to (III) is in the range of 100:0 to 100:90, preferably 100:0 to 100:80. When the molar ratio of (I) to (III) in the initial stage is 100:100 to 100:110, the resulting polymer will have a molecular weight distribution broader than that of a polymer obtained by the process of the present invention as will be shown in the following examples and comparative examples. When the former polymer is used as, for example, a scaling inhibitor, its effect is inferior to that of the polymer obtained by the process of the present invention.

In the production of the copolymer, the whole or part of the copolymerizable monomer (II) may be added to said aqueous solution in the initial stage. Thereafter, a polymerization initiator and, if necessary, the copolymerizable monomer (II) are added dropwise to the aqueous solution so as to carry out the polymerization reaction in the first stage. After the polymerization reaction in the first stage, the polymerization initiator is added dropwise to the polymerization system after the alkali metal hydroxide or ammonia (III) is added at once or while the latter is added dropwise thereto so as to complete the polymerization. In the course of the supplementation of the alkali metal hydroxide or ammonia, the copolymerizable monomer (II) may be added to the polymerization system. In the process of the present invention, the final molar ratio of (I) to (III) should be regulated in the range of 100:100 to 100 to 130. Outside this range, no high rate of polymerization can be obtained.

According to the process of the present invention as described above, the polymaleic acid and its copolymer having a narrow molecular weight distribution can be obtained with a high rate of polymerization. The polymaleic acid and its copolymer obtained by the process of the invention are useful as scaling inhibitors for boiler or desalination facilities, detergent builders, dispersants for inorganic pigments, etc.

The reaction temperature in the production of the polymer is 60° to 160° C. From the viewpoint of the reaction efficiency, the reaction temperature is preferably 80° to 140° C. The practical monomer concentration in the polymerization step is in the range of 30 to 85 wt. %. The reaction time is 2 to 12 h.

The polymerization initiators include water-soluble initiators such as persulfates, hydrogen peroxide, t-butyl peroxide and water-soluble azobis compounds, among which the persulfates, hydrogen peroxide and t-butyl peroxide are preferred. They are used in an amount of 0.5 to 200 mol for 100 mol of the monomer.

Though the most preferred polymerization solvent is water, it is preferred from the viewpoints of the solubility of the monomer and economy to use a solvent having a water content of at least 60 wt. %, preferably at least 90 wt. %. As the solvents other than water, alcohols such as ethanol and isopropanol and ketones such as methyl ethyl ketone and methyl isobutyl ketone may be used so far as the effects of the present invention are not damaged.

The polymer obtained by the process of the present invention has a molecular weight of 200 to 20,000, preferably 300 to 5,000. The polymer has a molecular weight distribution narrower than that of polymaleic acid or maleic acid copolymer produced in the prior art. Therefore, when the polymer is used as the scale inhibitor in boiler or desalination facilities, or as a detergent builder or dispersant for inorganic pigments, it exhibits a more excellent performance. According to the process of the present invention, polymaleic acid and its copolymer may be produced efficiently in an aqueous solvent at a low cost.

The following examples will further illustrate the present invention, which by no means limit the invention.

EXAMPLE 1

196 g (2.0 mol) of maleic anhydride and 75 g of water were placed in a flask fitted with a thermometer, stirrer, dropping funnel, nitrogen inlet tube and reflux condenser, and heated to 110° C. under stirring. The heating was stopped and then 68 g of a 60% aqueous hydrogen peroxide solution was added dropwise thereto over 2 h. In the course of the addition, the temperature of the reaction system was elevated to 128° C. After completion of the addition, the mixture was aged under reflux for 30 min. 167 g (2 mol) of 48% sodium hydroxide was added dropwise thereto over 2 h and simultaneously 35 g of a 30% aqueous sodium persulfate solution and 50 g of a 60% aqueous hydrogen peroxide solution were added dropwise thereto over 3 h. After completion of the addition, the mixture was aged for 1 h and then cooled to a temperature of below 40° C. to obtain an aqueous polymaleic acid solution having a solid content of 48% and pH of 4.91 (Experiment No. 1). For comparison, the same experiment as above was repeated except that no sodium hydroxide was added to the polymerization system (Experiment No. 2). Further, 167 g of 48% sodium hydroxide was added to a mixture of 196 g of maleic anhydride and 100 g of ion-exchanged water and then 118 g of a 60% aqueous hydrogen peroxide solution and 35 g of 30% sodium persulfate were added dropwise thereto under reflux over 6 h to carry out the polymerization (Experiment No. 3). The rates of polymerization and average molecular weights of the polymerization products were measured to obtain the results shown in Table 1. The rate of polymerization shown in Table 1 was determined from the remaining monomer determined by the bromine/bromide method. The average molecular weight of the copolymer was determined according to gel permeation chromatography. More particularly, the sodium salt of the polymer was diluted to 500 mg/100 ml (solid) with deionized water, 100 μl of the diluted salt was subjected to the gel permeation chromatography in a 0.15 M phosphate buffer solution (pH 7.0) at room temperature using an aqueous column G 4000 PW/G 2000 SW (a product of Toyo Soda Co.) to determine the number-average molecular weight. The light absorption was measured at 215 nm using a spectrophotometric detector SPD-1 (a product of Shimadzu Seisakusho). The above-mentioned methods were employed also in the following examples. In comparative examples, the molecular weight was not determined when the rate of polymerization was low.

TABLE 1

| Experiment No. (Note) | Degree of neutralization of maleic acid (molar ratio of MAN/NaOH) | | Rate of polymerization (%) | Number average molecular weight ($M_N$) | $M_W/M_N$ |
| --- | --- | --- | --- | --- | --- |
| | Initial | Final | | | |
| 1 | 0 | 1.0 | 93.1 | 390 | 1.32 |
| 2 | 0 | 0 | 60.7 | — | — |
| 3 | 1.0 | 1.0 | 95.1 | 510 | 3.56 |

$M_W$: weight-average molecular weight determined from GPC,
$M_N$: number-average molecular weight determined from GPC.
(Note)
Experiment No. 1: example of the present invention
Experiments Nos. 2 and 3: comparative examples

EXAMPLE 2

196 g (20 mol) of maleic anhydride and 60 g of ion-exchanged water where placed in a four-necked flask fitted with the same devices as in Example 1. 117 g (1.4 mil) of 48% sodium hydroxide was added thereto under stirring to neutralize the same. 20.4 g (0.2 mol) of polyoxyethylene monoallyl ether (hereinafter referred to as "POA") having one ethylene oxide unit per molecule was added to the mixture and the temperature was elevated to 110° C. 68 g of a 60% aqueous hydrogen peroxide solution and 20.4 g (0.2 mol) of POA were added dropwise thereto over 2 h. The maximum temperature of the reaction mixture reached 118° C. After completion of the addition, the product was aged under reflux for 1 h. 47 g of 30% sodium persulfate and 57 g of a 60% aqueous hydrogen peroxide solution were added dropwise thereto over 3 h. Simultaneously, 50 g (0.6 mol) of 48% NaOH and 20.4 g (0.2 mol) of POA were added dropwise thereto over 2 h. After completion of the addition, the product was aged under reflux for 2 h. The mixture was cooled to below 40° C. to obtain an aqueous copolymer solution having a solid content of 50% and pH of 4.86 (Experiment No. 4). For comparison, the same experiment as above was repeated except that the supplementation of 50 g of 48% NaOH to the polymerization system was omitted (Experiment No. 5). Further, 167 g of 48% sodium hydroxide was added to a mixture of 196 g of maleic anhydride and 100 g of ion-exchanged water, to which was then added 30.6 g of POA. Additional 30.6 g of POA was added thereto dropwise over 4 h and simultaneously, 47 g of 30% sodium persulfate and 125 g of a 60% aqueous hydrogen peroxide solution were added dropwise thereto over h to obtain a polymer (Experiment No. 6). The test results of the polymerization products are shown in Table 2.

EXAMPLE 3

196 g (2 mol) of maleic anhydride and 150 g of ion-exchanged water were placed in a four-necked flask fitted with the same devices as in Example 1. 117 g (1.4 mol) of 48% sodium hydroxide was added thereto under stirring to neutralize the same. 94.8 g (0.6 mol) of sodium methallylsulfonate was added thereto and the temperature was elevated to a reflux temperature. Thereafter, 68 g of a 60% hydrogen peroxide solution was added dropwise thereto over 2 h. After aging for 1 h, 47 g of 30% sodium persulfate and 57 g of a 60% aqueous hydrogen peroxide solution were added dropwise thereto over 3 h. Simultaneously 50 g (0.6 mol) of 48% NaOH was added dropwise over 2 h. After aging under reflux for 2 h, the reaction mixture was cooled to obtain a copolymer of maleic acid and methallylsulfonic acid (molar ratio of 100/30).

The resulting copolymer had a rate of polymerization of 92.8%, a number-average molecular weight of 420 and $M_W/M_N$ of 1.26.

The embodiments of the invention in which an exclusive property or privilege is claimed are defined as follows:

1. A process for preparing a homoplymer of maleic acid, which comprises the steps of:
    neutralizing a monomer of (I) maleic acid or maleic anhydride in an aqueous medium with (III) an alkali metal hydroxide or ammonia so that the molar ratio of (I) to (III) in the aqueous medium is in the range of 100:00 to 100:90,
    beginning the polymerization of the monomer in the presence of a polymerization initiator,
    adding a further amount of said alkali metal hydroxide or ammonia so that the molar ratio of (I):(III) in the aqueous medium is from 100:100 to 100:130,
    then completing the polymerization of said monomer (I).

2. A process as claimed in claim 1, in which the aqueous medium consists of water.

3. A process as claimed in claim 1, in which the polymerization of the monomer takes place at a temperature in the range of 60°-160° C.

4. A process as claimed in claim 1, in which the polymerization of the monomer takes place at a temperature in the range of 80°-140° C.

5. A process as claimed in claim 1, in which the monomer concentration is in the range of 30-85 wt. %.

6. A process as claimed in claim 1, in which the polymerization initiator is selected from the group consist-

TABLE 2

| Experiment No. (Note) | Degree of neutralization of maleic acid (molar ratio of MAN/NaOH) | | Rate of polymerization (%) | Number average molecular weight ($M_W$) | $M_W/M_N$ | Molar rate of MAN/POA |
| --- | --- | --- | --- | --- | --- | --- |
| | Initial | Final | | | | |
| 4 | 0.7 | 1.0 | 94.1 | 490 | 1.39 | 100/30 |
| 5 | 0.7 | 0 | 80.1 | — | — | " |
| 6 | 1.0 | 1.0 | 96.8 | 720 | 3.96 | " |

(Note)
Experiment No. 4: example of the present invention
Experiments Nos. 5 and 6: comparative examples ing of water soluble persulfates, hydrogen peroxide, t-butyl peroxide and water soluble azobis compounds.

7. A process for producing a polymaleate homopolymer having a molecular weight of from 200 to 2000 and having a narrow molecular weight distribution, which comprises:
providing a solution of (A) maleic acid monomer or maliec anhydride monomer containing from 0 to 90 mols of (B) alkali metal hydroxide or ammonia, per 100 mols of (A), in a solvent consisting of at leasta 60 percent by weight of water and up to 40 percent by weight of an alcohol or ketone, said solution containing from 30 to 85 percent by weight of said monomer,
then polymerizing said monomer in the presence of an amount of water-soluble polymerization initiator effective to initiate polymerization of said monomer, at a polymerization temperature of from 60° to 160° C.; adding a further amount of (B) to said solution so that the molar ratio of (A)/(B) in said solution is from 100/100 to 100/130; and then completing the polymerization of said monomer so that an aqueous solultion of a polymaleate homopolymer is formed.

8. A process as claimed in claim 7 in which said solvent contains at least 90 percent by weight of water, the polymerization reaction temperature is from 80° to 140° C. and the polymerization reaction time is from 2 to 12 hours.

9. A process as claimed in claim 7 in which an additional amount of polymerization initiator is added after said further amount of (B) has been added to said solution.

10. A process as claimed in claim 7 in which an aqueous solution of sodium hydroxide, potassium hydroxide or ammonia is added to an aqueous solution of maleic anhydride to obtain the solution.

11. A process for producing a polymaleate homopolymer having a molecular weight of from 200 to 2000 and having a narrow molecular weight distribution, which comprises:
providing an aqueous solution of (A) maleic acid monomer or maleic anhydride monomer and from 0 to 90 mols of (B) alkali metal hydroxide or ammonia, per 100 mols of (A), said solution containing from 30 to 85 percent by weight of said monomer,
then polymerizing said monomer in the presence of an amount of water-soluble polymerization initiator effective to initiate polymerization of said monomer, at a polymerization temperature of from 60° to 160° C.; adding a further amount of (B) to said solution so that the molar ratio of (A)/(B) in said solution is from 100/100 to 100/130; adding an additional amount of said initiator to said solution; and then completing the polymerization of said monomer so that an aqueous solution of a polymaleate homopolymer is formed.

* * * * *